United States Patent
Subramaniam et al.

(10) Patent No.: US 10,990,450 B2
(45) Date of Patent: Apr. 27, 2021

(54) AUTOMATIC CLUSTER CONSOLIDATION FOR EFFICIENT RESOURCE MANAGEMENT

(71) Applicant: VMWARE, INC., Palo Alto, CA (US)

(72) Inventors: Sabareesh Subramaniam, Santa Clara, CA (US); Fei Guo, San Jose, CA (US); Maarten Wiggers, San Francisco, CA (US); Sai Inabattini, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 374 days.

(21) Appl. No.: 16/140,571

(22) Filed: Sep. 25, 2018

(65) Prior Publication Data

US 2020/0026810 A1 Jan. 23, 2020

(30) Foreign Application Priority Data

Jul. 23, 2018 (IN) .............................. 201841027603

(51) Int. Cl.
- *G06F 9/50* (2006.01)
- *G06F 9/455* (2018.01)
- *G06F 9/38* (2018.01)
- *G06F 1/3206* (2019.01)

(52) U.S. Cl.
CPC .......... *G06F 9/5077* (2013.01); *G06F 1/3206* (2013.01); *G06F 9/3891* (2013.01); *G06F 9/45558* (2013.01); *G06F 2009/45595* (2013.01); *G06F 2209/5011* (2013.01)

(58) Field of Classification Search
CPC ............ G06F 11/3476; G06F 11/3419; G06F 9/45533; G06F 2201/815
See application file for complete search history.

(56) References Cited

U.S. PATENT DOCUMENTS

| | | |
|---|---|---|
| 2010/0070784 A1 | 3/2010 | Gupta et al. |
| 2011/0252208 A1* | 10/2011 | Ali ...................... G06F 11/1451 711/162 |

(Continued)

FOREIGN PATENT DOCUMENTS

KR 10-2016-0114269 A 10/2016

OTHER PUBLICATIONS

Mazumdar et al., "Power efficient server consolidation for Cloud data center" (May 2017), Future Generation Computer Systems, vol. 70, pp. 4-16 [retrieved from https://www.sciencedirect.com/science/article/pii/S0167739X16308093].*

(Continued)

*Primary Examiner* — Brian W Wathen
(74) *Attorney, Agent, or Firm* — Loza & Loza, LLP (57) ABSTRACT

A system and method for automatically consolidating clusters of host computers in a distributed computer system uses a digital representation of a simulated merged cluster of host computers to produce resource management analysis results on the simulated merged cluster of host computers. The simulated merged cluster of host computers is a simulation of a consolidation of first and second clusters of host computers. In addition, the system and method involves executing an automatic consolidation operation on the first and second clusters of host computers to generate a merged cluster of host computers that includes the host computers from both the first and second clusters.

20 Claims, 10 Drawing Sheets

(56) References Cited

U.S. PATENT DOCUMENTS

| | | | |
|---|---|---|---|
| 2012/0239376 A1* | 9/2012 | Kraft | G06F 11/3476 |
| | | | 703/22 |
| 2014/0082201 A1 | 3/2014 | Shankari et al. | |
| 2015/0058265 A1 | 2/2015 | Padala et al. | |
| 2015/0058843 A1 | 2/2015 | Holler et al. | |
| 2018/0048532 A1* | 2/2018 | Poort | H04L 41/147 |

OTHER PUBLICATIONS

Mehta et al., "ReCon: A Tool to Recommend Dynamic Server Consolidation in Multi-Cluster Data Centers" (Aug. 2008), 2008 IEEE Network Operations and Management Symposium, pp. 363-370 [retrieved from https://ieeexplore.ieee.org/stamp/stamp.jsp?tp=&arnumber=4575156].*

Lee et al., "Efficient Server Consolidation Considering Intra-Cluster Traffic" (Dec. 2011), 2011 IEEE Global Telecommunications Conference, pp. 1-6 [retrieved from https://ieeexplore.ieee.org/stamp/stamp.jsp?tp=&arnumber=6133625].*

Hermenier et al., "Entropy: a Consolidation Manager for Clusters" (Mar. 2009), VEE '09: Proceedings of the 2009 ACM SIGPLAN/SIGOPS international conference on Virtual execution environments, pp. 41-50 [retrieved from https://dl.acm.org/doi/pdf/10.1145/1508293.1508300].*

International Search Report and Written Opinion, PCT/US2019/043061, dated Nov. 18, 2019.

VMWARE, Inc. "vSphere Resource Management", ESXi 6.0, vCenter Server 6.0, 2015, 136 pgs.

VMWARE, Inc. "VMware vSAN Documentation", https://docs.vmware.com/en/VMware-vSAN/index.html, retrieved Aug. 15, 2020, 3 pgs.

VMWARE, Inc. "Configuration Maximums; vSphere 4", 2008-2009, 9 pgs.

VMWARE, Inc. "Configuration Maximums; vSphere 6", 2015, 32 pgs.

VMWARE, Inc. "Configuration Maximums; vSphere 6.5", 2016, 36 pgs.

Turbonomic Blog, "Superclusters to the Rescue!", Posted by Will Searle on Dec 18, 2015, 8 pgs.

* cited by examiner

AUTOMATIC CLUSTER CONSOLIDATION FOR EFFICIENT RESOURCE MANAGEMENT

RELATED APPLICATIONS

Benefit is claimed under 35 U.S.C. 119(a)-(d) to Foreign Application Serial No. 201841027603 filed in India entitled "AUTOMATIC CLUSTER CONSOLIDATION FOR EFFICIENT RESOURCE MANAGEMENT", on Jul. 23, 2018, by VMware, Inc., which is herein incorporated in its entirety by reference for all purposes.

BACKGROUND

Resource-consuming entities, such as virtual machines (VMs) or other virtual processing instances capable of running various applications, can be used to deploy applications in one or more virtual datacenters, which are collections of computing, storage, and networking resources that may be supported in a distributed computer system. These resource-consuming entities are hosted on host computers in the distributed computer system. The host computers may be logically grouped into clusters of host computers so that the host computers in the same cluster can be managed together with respect to, for example, resources and capabilities. As an example, features such as VMware vSphere® Distributed Resource Scheduler™ (DRS) feature, VMware vSphere® High Availability (HA) feature and VMware vSphere® Distributed Power Management (DPM) feature can be applied to different clusters of host computers to help customers manage their host computers and the resource-consuming entities running on the host computers. The number of host computers in a cluster (cluster size) has significant impact on the efficiency of these cluster features. This is because a larger cluster size implies more options for a cluster resource manager, such as the Distributed Resource Scheduler™ (DRS) manager, resulting in better decisions when managing resource pools, allocating resources for the cluster and balancing the cluster load. In order to enable these improvements in resource utilization, the supported maximum cluster size has been increasing, for example, from 32 to 64 in VMware vSphere® 6.0 release.

However, despite the increase in supported cluster size, telemetry reports indicate that the average cluster size in customer environments is still as small as ten host computers per cluster. An important reason that prevents customers from consolidating existing small clusters is the difficulty in identifying which clusters to consolidate and the consolidation process itself. The former needs deep knowledge about workload demand patterns and cluster resource settings, and the latter involves a sophisticated sequence of operations.

SUMMARY

A system and method for automatically consolidating clusters of host computers in a distributed computer system uses a digital representation of a simulated merged cluster of host computers to produce resource management analysis results on the simulated merged cluster of host computers. The simulated merged cluster of host computers is a simulation of a consolidation of first and second clusters of host computers. In addition, the system and method involves executing an automatic consolidation operation on the first and second clusters of host computers to generate a merged cluster of host computers that includes the host computers from both the first and second clusters.

A method for automatically consolidating clusters of host computers in a distributed computer system in accordance with an embodiment of the invention comprises receiving digital representations of first and second clusters of host computers in the distributed computer system, generating a digital representation of a simulated merged cluster of host computers using the digital representations of the first and second clusters of host computers, the simulated merged cluster of host computers being a simulation of a consolidation of the first and second clusters of host computers, applying a resource management operation on the digital representation of the simulated merged cluster of host computers to produce resource management analysis results on the simulated merged cluster of host computers, and executing an automatic consolidation operation on the first and second clusters of host computers to generate a merged cluster of host computers that includes the host computers from both the first and second clusters. In some embodiments, the steps of this method are performed when program instructions contained in a non-transitory computer-readable storage medium is executed by one or more processors.

A management server for a distributed computer system in accordance with an embodiment of the invention comprises a processor, and a client placement engine that, when executed by the processor, performs steps comprising receiving placement requirements of the clients, receiving physical network topology information of a distributed computer system, determining candidate client placement locations in the distributed computer system where the placement requirements of the clients can be satisfied, and selecting final client placement locations to place the clients from the candidate client placement locations based on at least the physical network topology information of the distributed computer system.

A system in accordance with an embodiment of the invention comprises a processor, and a cluster consolidation manager that, when executed by the processor, performs steps comprising receiving digital representations of first and second clusters of host computers in the distributed computer system, generating a digital representation of a simulated merged cluster of host computers using the digital representations of the first and second clusters of host computers, the simulated merged cluster of host computers being a simulation of a consolidation of the first and second clusters of host computers, applying a resource management operation on the digital representation of the simulated merged cluster of host computers to produce resource management analysis results on the simulated merged cluster of host computers, and executing an automatic consolidation operation on the first and second clusters of host computers to generate a merged cluster of host computers that includes the host computers from both the first and second clusters.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
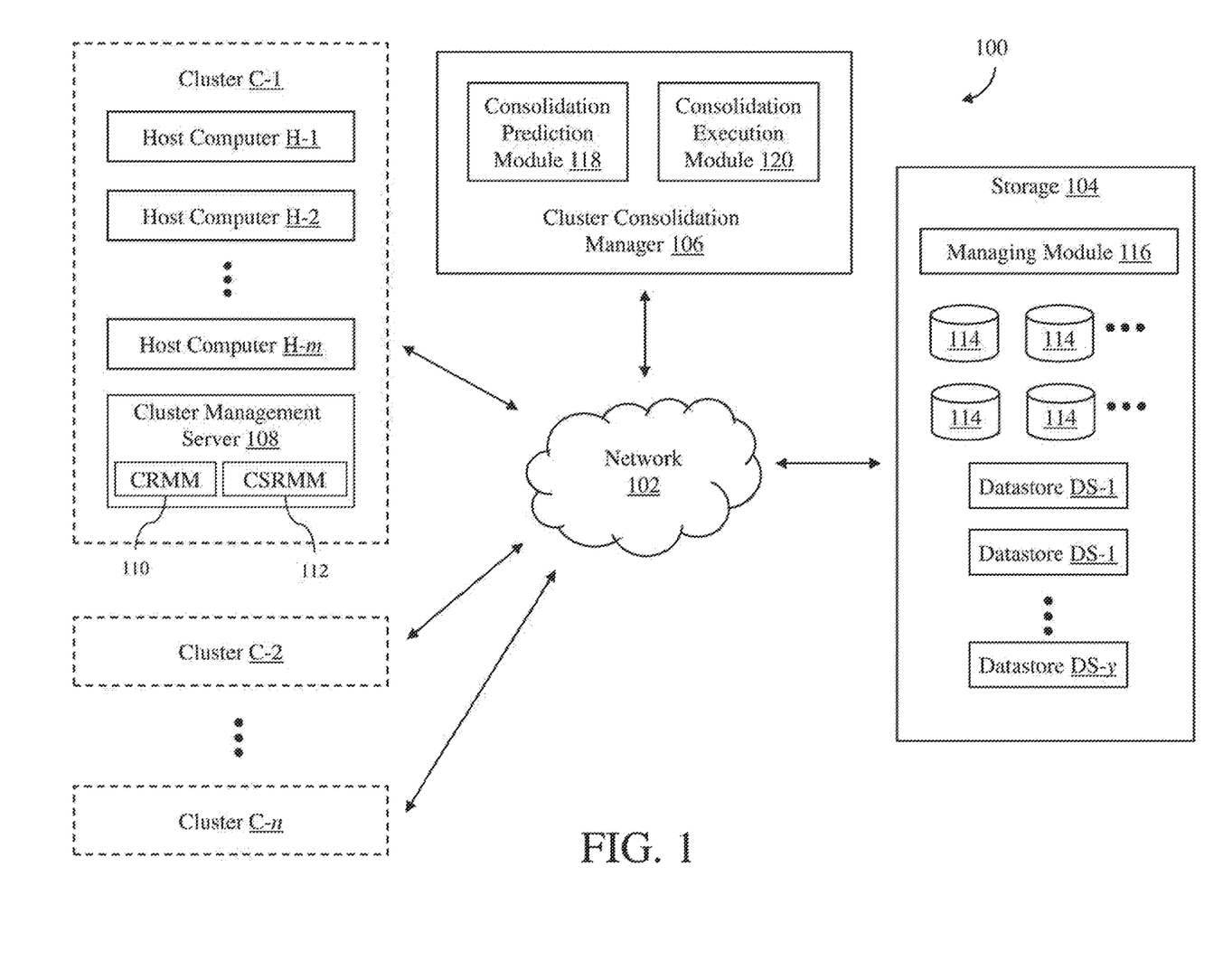
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-n of host computers (where n is a positive integer), storage 104, and a cluster consolidation manager 106. As described in detail below, the cluster consolidation manager 106 allows users to see the effects of possible cluster consolidations so that the users can decide whether to consolidate any of the clusters. In addition, the cluster consolidation manager can automatically execute processes for user-selected cluster consolidations without any user involvement after the consolidation process has been initiated.

As shown in FIG. 1, each of the clusters C-1, C-2 . . . C-n in the distributed computer system 100 includes a number of host computers H-1, H-2 . . . H-m (where m is a positive integer) and a cluster management server 108. The number of host computers included in each of the clusters can be any number from one to several hundred or more. In addition, the number of host computers included in each of the clusters can vary so that different clusters can have a different number of host computers. In an embodiment, the host computers are physical computer systems with virtualization software, such as VMware ESXi™ software, that can host or support one or more virtual processing entities so that the virtual processing entities are executing on the physical computer systems. As used herein, the term "virtual processing entity" is any software entity that can run on a computer system to process one or more software programs, such as a software application, a software process, a virtual machine (VM) or a "container" that provides system-level process isolation or operating system level virtualization such as Docker™ software. The host computers may be servers that are commonly found in datacenters. As an example, the host computers may be servers installed in one or more server racks. The host computers in the clusters C-1, C-2 . . . C-n are connected to the network 102, and thus, each host computer is able to access any component connected to the network, such as the storage 104. Consequently, any virtual processing entity running on any of the host computers in the clusters C-1, C-2 . . . C-n may also access any component connected to the network 102.

Figure 2:
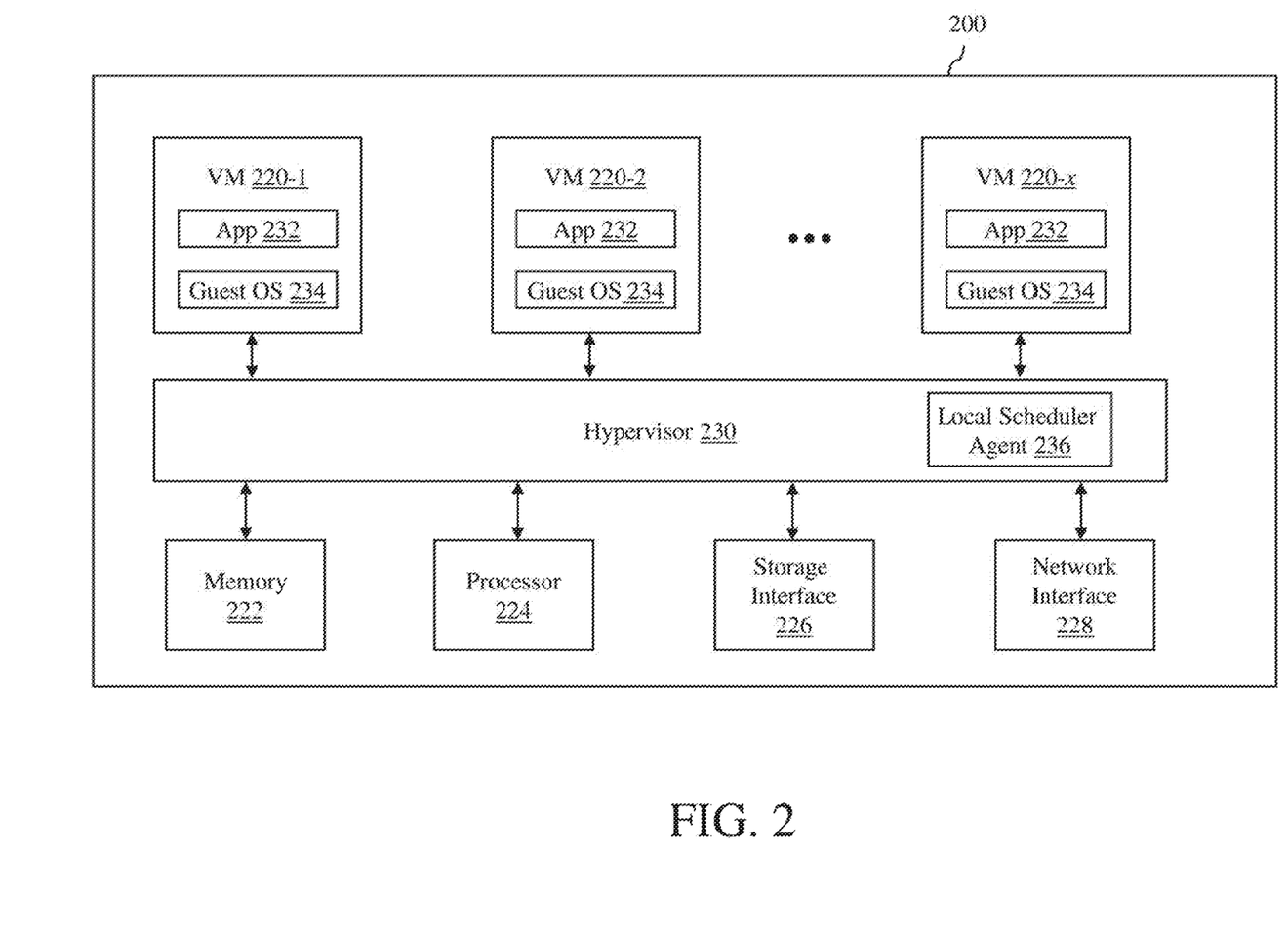
FIG. 2 is a block diagram of a host computer in accordance with an embodiment of the invention.

Turning now to FIG. 2, components of a host computer 200 that is representative of the host computers H-1, H-2 . . . H-m in accordance with an embodiment of the invention are shown. In FIG. 2, the physical connections between the various components of the host computer 200 are not illustrated. In the illustrated embodiment, the host computer is configured to support a number of virtual processing entities 220-1, 220-2 . . . 220-x (where x is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220-1, 220-2 . . . 220-x run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 234 forms a software platform on top of which guest applications 234 run.

Similar to any other computer system connected to the network 102, the VMs 220-1, 220-2 . . . 220-x are able to communicate with each other using an internal software OSI Layer 2 switch (not shown) and with other computer systems connected to the network using the network interface 228 of the host computer 200. In addition, the VMs are able to access the storage 104 using the storage interface 226 of the host computer.

The host computer 200 also includes a local scheduler agent 236 that operates as part of a resource management system, such as VMware vSphere® Distributed Resource Scheduler™ (DRS) system, to manage resource requests made by the VMs 220-1, 220-2 . . . 220-x. In an embodiment, the local scheduler agent may be integrated as part of the hypervisor, and thus, is implemented in software. However, in other embodiments, the local scheduler agent may be implemented using any combination of software and hardware.

Turning back to FIG. 1, each of the cluster management servers 108 in the clusters C-1, C-2 . . . C-n operates to monitor and manage the host computers H-1, H-2 . . . H-m in the respective cluster. Each cluster management server may be configured to monitor the current configurations of the host computers and the virtual processing entities, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include virtual processing entity hosting information, i.e., which virtual processing entities are hosted or running on which host computers. The monitored configurations may also include virtual processing entity information. The virtual processing entity information may include size of each of the virtual processing entities, virtualized hardware configuration of each of the virtual processing entities, such as virtual CPU type and virtual memory size, software configuration of each of the virtual processing entities, such as OS type and installed applications or software programs running on each of the virtual processing entities, and virtual storage size for each of the virtual processing entities. The virtual processing entity information may also include resource parameter settings, such as demand, limit, reservation and share values for various resources, e.g., CPU, memory, network bandwidth and storage, which are consumed by the virtual processing entities. The "demand," or current usage, of the virtual processing entities for the consumable resources, such as CPU, memory, network, and storage, are measured by the host computers hosting the virtual processing entities and provided to the respective cluster management server.

The cluster management servers 108 may also perform various operations to manage the virtual processing entities and the host computers H-1, H-2 . . . H-m in their respective clusters. As illustrated in FIG. 1, in an embodiment, each cluster management server includes a cluster resource management module (CRMM) 110, which can be enabled by a user, to perform resource allocations and load balancing in the respective cluster. The cluster resource management module operates to allocate available resources among virtual processing entities running in the cluster based on a number of parameters, which may include predefined rules and priorities. The cluster resource management module may also be configured to power down particular virtual processing entities and/or host computers in the cluster to conserve power. The cluster resource management module may further be configured or programmed to perform other operations to manage the cluster. Each cluster management server may also include a cluster storage resource management module (CSRMM) 112, which can be enabled by a user, to perform storage resource management for the respective cluster. The cluster storage resource management module enables virtual processing entity disk placements (e.g., VM disk placements) and migrations to balance space and I/O resources across datastores that are associated with the cluster via recommendations or automated operations.

In some embodiments, the cluster management servers 108 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220-1, 220-2 . . . 220-x. In an implementation, the cluster management servers are VMware® vCenter™ servers with at least some of the features available for such servers, the cluster resource management modules 110 in the cluster management servers are VMware vSphere® Distributed Resource Scheduler™ systems, and the cluster storage resource management modules 112 in the cluster management servers are VMware® Storage Distributed Resource Scheduler™ systems.

The network 102 can be any type of computer network or a combination of networks that allows communications between devices connected to the network. The network 102 may include the Internet, a wide area network (WAN), a local area network (LAN), a storage area network (SAN), a Fibre Channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-n, which can be accessed like any other storage device connected to computer systems. The storage includes one or more computer data storage devices 114. The storage includes a storage managing module 116, which manages the operation of the storage. The storage supports multiple datastores DS-1, DS-2 . . . DS-y (where y is a positive integer), which may be identified using logical unit numbers (LUNs).

The cluster consolidation manager 106 operates to easily allow users to see the effects of possible cluster consolidations and to automatically execute user-selected cluster consolidations. The cluster consolidation manager may be implemented in any combination of software, hardware and firmware. In an embodiment, the cluster consolidation manager is implemented as one or more software programs running on one or more computers, which may be physical computers or virtual computers, such as the VMs running on the host computers in the clusters C-1, C-2 . . . C-n.

As illustrated in FIG. 1, the cluster consolidation manager 106 includes a consolidation prediction module 118 and a consolidation execution module 120. The consolidation prediction module performs operations to predict the results of a simulated consolidation of some of the clusters C-1, C-2 . . . C-n of host computers in the distributed computer system 100. The consolidation execution module performs operations to execute a consolidation process of user-selected clusters of host computers.

Figure 3:
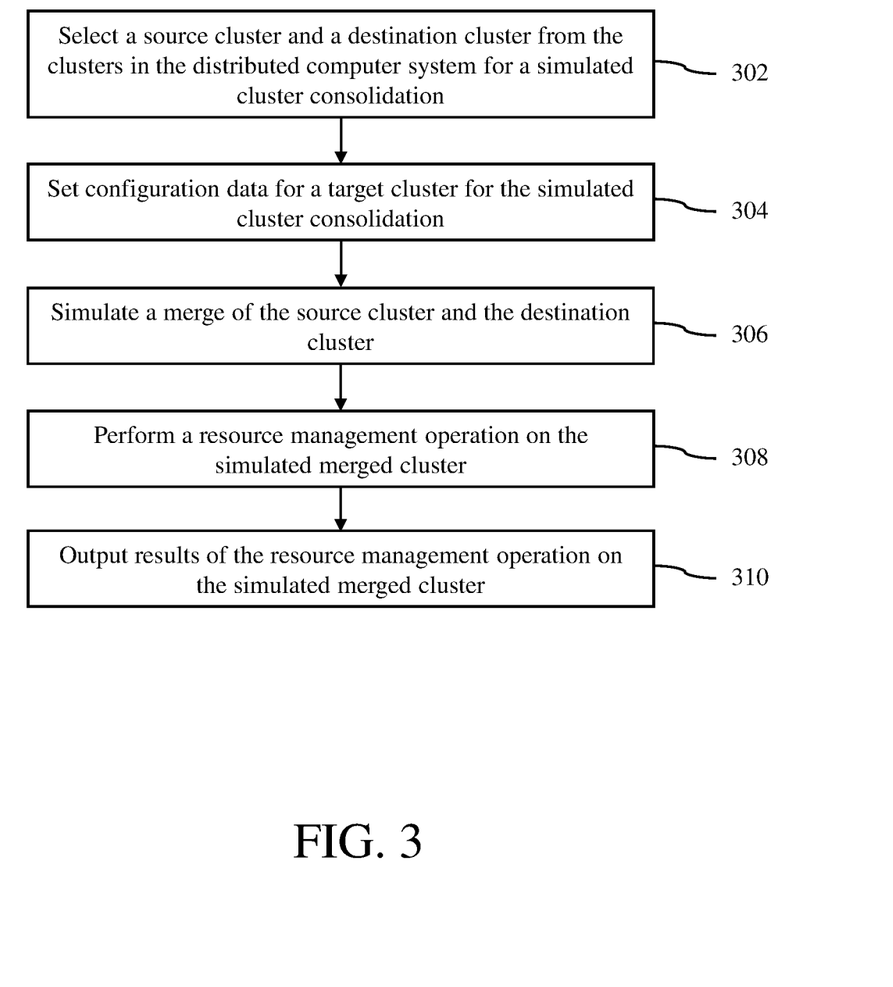
FIG. 3 is a flow diagram of a cluster consolidation prediction process in accordance with an embodiment of the invention.

A cluster consolidation prediction process using the consolidation prediction module 118 in accordance with an embodiment of the invention is described with reference to a flow diagram of FIG. 3. At block 302, a source cluster and a destination cluster are selected from the clusters C-1, C-2 . . . C-n in the distributed computer system 100 for a simulated cluster consolidation. In one implementation, the selection of the source and destination clusters may be made by a user using a user interface, which may be provided by the cluster consolidation manager 106. In another implementation, the selection of the source and destination clusters may be made automatically by the consolidation prediction module in response to user input to initiate the cluster consolidation prediction process. In such implementation, different combination of source and destination clusters may be selected to provide multiple predictions for different potential cluster consolidations.

Next, at block 304, configuration data for a target cluster is set for the simulated cluster consolidation. The target cluster is the resulting cluster or the merged cluster after the source and destination clusters have been consolidated. The configuration data for the target cluster may include cluster configurations, such the total number of host computers that would be included in the target cluster, high availability configurations and resource management configurations (e.g., DRS configurations). In one implementation, the cluster configurations may be manually set by a user using a user interface. In another implementation, the cluster configurations may be automatically set by the consolidation prediction module 118 using configuration information from the source and destination clusters. In an embodiment, the consolidation prediction module may request snapshots of the source and destination clusters from the respective cluster management servers 108 to receive the configuration information of the source and destination clusters. A snapshot of a cluster of host computers is a digital representation of that cluster of host computers at a moment of time. The cluster snapshot includes various information regarding configuration and state of the cluster, including configurations and states of various hardware and software elements in the cluster. Each cluster snapshot may include, for example, (a) user-configured values for resource management options (e.g., advanced DRS options), (b) a list of host computers in the cluster with capacity information, (c) a list of virtual processing entities (e.g., VMs) in the cluster with resource/network/storage configurations and compatible host computer information for each virtual processing entity, (d) resource demand statistics for the host computers and the virtual processing entities in the cluster, and (e) cluster metrics for resource management (e.g., cluster metrics used by DRS, such as imbalance threshold). In this embodiment, the configuration data for the target cluster is set by the consolidation prediction module using the information derived from the snapshots of the source and destination clusters.

Next, at block 306, a merge of the source cluster and the destination cluster is simulated by the consolidation prediction module 118. In an embodiment, a cluster's state is logged into a file called a drmdump every time DRS runs on the cluster. The drmdump file contains the list of all entities in the cluster (e.g., VMs, host computers, resource pools and datastores), their properties and their relationships to one another. In addition, the drmdump file also contains the activity/usage on all these objects. This file is created when all of this information is "dumped" from the cluster. Thus, the drmdump file is a complete, abstract, description of the cluster state at the time of the dump. Given the dumps of the source and destination clusters, the consolidation execution module 120 can construct the state of the consolidated cluster.

Next, at block 308, a resource management operation is performed on the simulated merged cluster. In an embodiment, the resource management operation includes a load balancing operation to determine whether virtual processing entities can be migrated to different host computers in the simulated merged cluster to better distribute workload among the host computers in the simulated merged cluster. The load balancing operation may involve monitoring distribution and usage of CPU and memory resources for all host computers and virtual processing entities in the simulated merged cluster. These metrics may be compared to an ideal resource utilization given the attributes of the simulated merged cluster's resource pools and virtual processing entities, current demand, and an imbalance target. The load balancing operation then makes recommendations regarding migrations of one or more virtual processing entities to different host computers in the simulated merged cluster to maintain proper load balancing. In some embodiments, the resource management operation may also include a power management operation to determine whether any of the host computers in the merged cluster should be powered off to save power or powered on to increase work capacity of one or more virtual processing entities in the simulated merged cluster. In an embodiment, the algorithms executed for the resource management operation performed on the simulated merged cluster are the same algorithms used by VMware vSphere® Distributed Resource Scheduler™ (DRS) software.

Next, at block 310, results of the resource management operation on the simulated merged cluster are outputted, for example, on a display. The results of the resource management operation may include HA-related capacity improvement (e.g., MHz and MB reclaimed as a result of the merge), power saving (e.g., number of host computers that can be powered off as a result of the merge) and virtual processing entity migration recommendations for load balancing (e.g., which virtual machines should be migrated to other host computers for load balancing). Thus, based on these results, the customer can compare the benefits of merging different cluster combinations.

Capacity Improvements

Figure 4A:
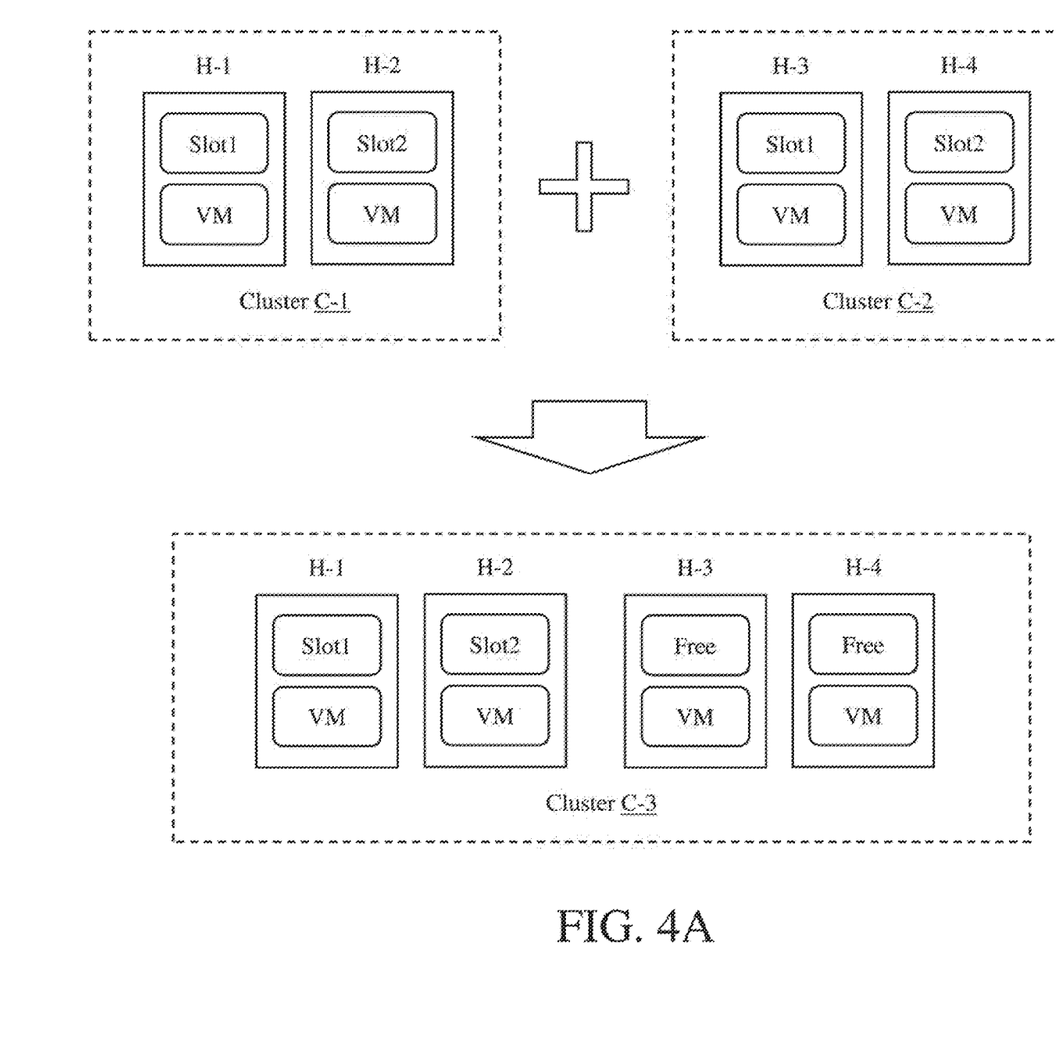
FIGS. 4A-4C illustrate different results of cluster consolidations in accordance with embodiments of the invention.

In many cases, merging clusters will enable some capacity to be reclaimed. For instance, consider the merger of two clusters with two host computers each, as illustrated in FIG. 4A. In this example, there are two small clusters of host computers, C-1 and C-2, which are simulated to be merged into a larger cluster C-3 of host computers. The cluster C-1 has host computers H-1 and H-2, while the cluster C-2 has host computers H-3 and H-4. Each of the host computers H-1, H-2, H-3 and H-4 has a single virtual machine VM. Let's assume HA is enabled in both clusters with an option "Host Failures to Tolerate" is set to 1. The "Host Failures to Tolerate" policy reserves enough capacity in the cluster to guarantee that all virtual machines from a failed host computer can be restarted on some other host computer in the cluster. This is done by computing a CPU and memory "slot" which is the largest CPU and memory reservation for any VM in the cluster. The number of "slots" on each host computer is computed and enough slots are reserved across all host computers to failover virtual machines from the host computer containing the most slots.

In the example of FIG. 4A, based on VM reservations, each host computer can hold two slots and therefore, two slots need to be reserved in each of pre-merged clusters C-1 and C-2 for VM failover. Thus, each host computer in the clusters C-1 and C-2 includes an open slot, Slot1 or Slot2, and another slot occupied by a virtual machine. However, in the merged cluster C-3, only two slots need to be reserved to tolerate one host failure, which frees up two slots' capacity for workloads. Thus, as illustrated in FIG. 4A, the host computer H-1 has the first slot Slot1 and the host computer H-2 has the second slot Slot2. But each of the host computers H-3 and H-4 has a free slot. This efficiency can be realized with all of the HA failover policies since the absolute value of reserved capacity in the merged cluster will always be less than when the clusters were distinct. Of course, the increased capacity can also be used to provide better availability guarantees. For example, in FIG. 4A, reserving four slots would enable the cluster C-3 to tolerate two host failures.

Power Savings

Distributed Power Management (DPM) is a VMware vSphere® feature which enables power savings by consolidating workloads (VMs) onto as few host computers as possible. The DPM then moves the freed up host computers into a low power standby mode. While consolidating, the DPM ensures that none of the powered on hosts become over-utilized, i.e., the utilization does not exceed a tunable dpmHighThreshold (defaults to 81%).

Figure 4B:
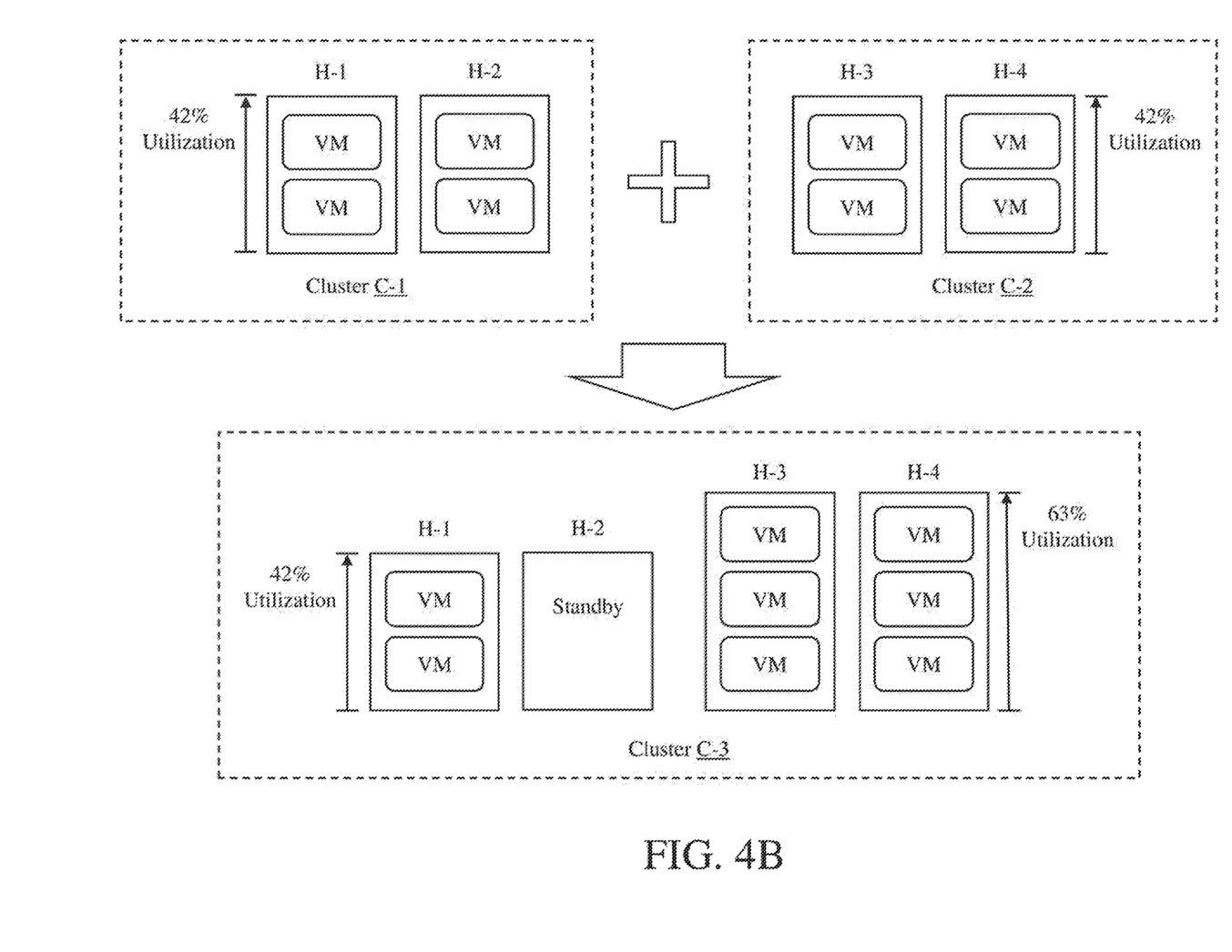

Let's consider the merger of two clusters with two host computers each, as illustrated in FIG. 4B. In this example, there are two small clusters of host computers, C-1 and C-2, where each cluster has two identical host computers, which are simulated to be merged into a larger cluster of host computers, C-3. The cluster C-1 has host computers H-1 and H-2, while the cluster C-2 has host computers H-3 and H-4. Each host computer runs two identical virtual machines (VMs) with about 42% resource utilized. None of the clusters allows all VMs to be consolidated into one host computer and turn off the other host computer to save power because the remaining host computer would reach 84% resource utilization, which, in this example, is disallowed by a power management policy (e.g., dpmThreshold is set at 81%). However, in the merged cluster C-3, one of the host computers, such as the host computer H-2, could be powered down and the VMs could be spread across the other three host computers without overloading any of the host computers, which results in power savings. This is possible since, in the merged cluster C-3, each of the host computers H-3 and H-4 can run three virtual machines with about 63% resource utilized.

Load Balance Improvement

Cluster merge is most beneficial when the workloads in both clusters are compatible. If there are storage (e.g.: datastores) or network (e.g.: distributed virtual switch) incompatibilities which prevent virtual machines from moving between the two clusters being consider for consolidation, cluster merge cannot help alleviate performance problems due to imbalance across the clusters.

Figure 4C:
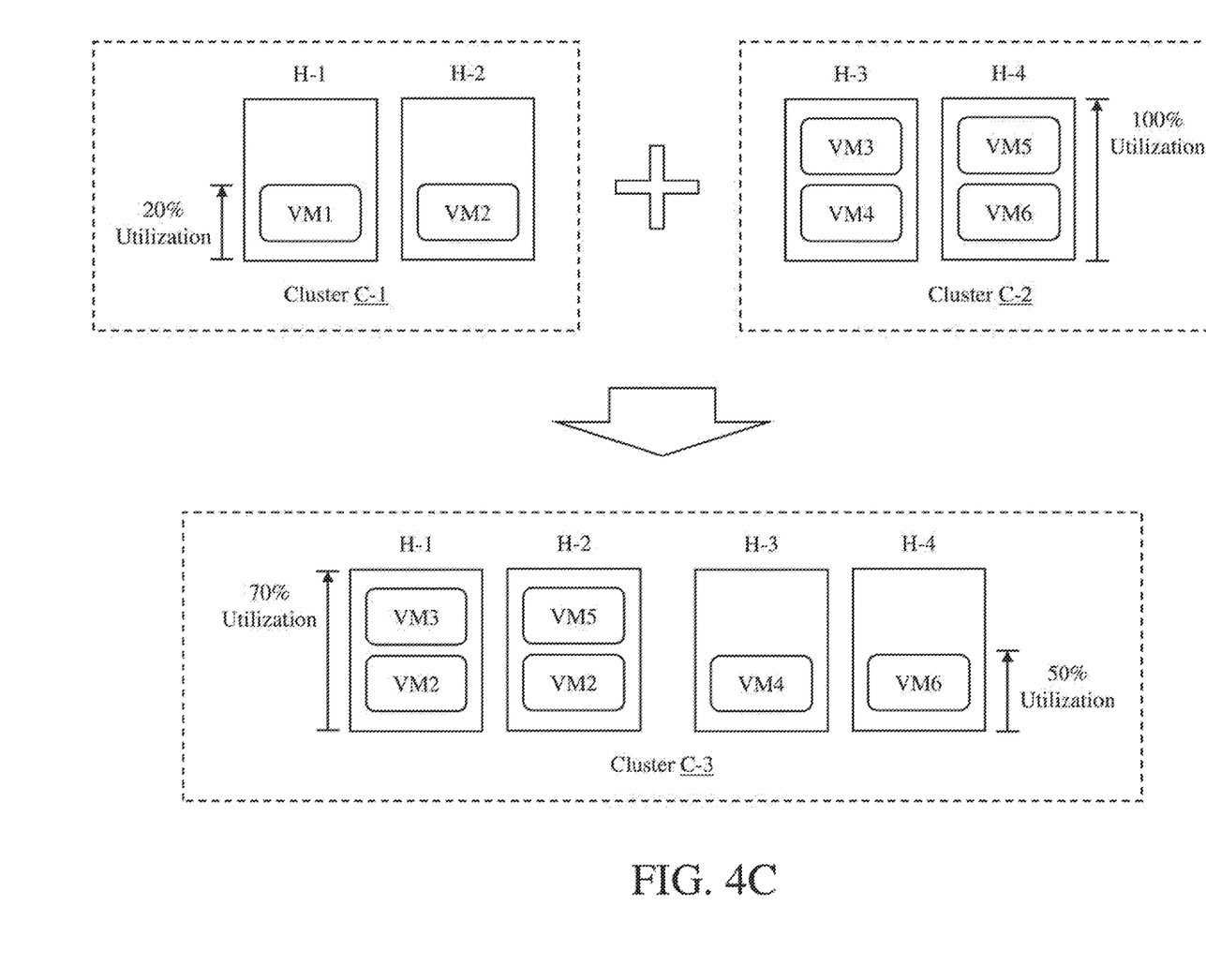

Let's consider the merger of two clusters with two host computers each, as illustrated in FIG. 4C. In this example, there are two small clusters of host computers, C-1 and C-2, where each cluster has two host computers, which are simulated to be merged into a larger cluster of host computers, C-3. The host computers H-1 and H-2 each includes a single virtual machine. The host computer H-1 includes a virtual machine VM1, while the host computer H-2 includes a virtual machine VM2. The host computers H-3 and H-4 each includes two virtual machines. The host computer H-3 includes virtual machines VM3 and VM4, while the host computer H-4 includes virtual machines VM5 and VM6. The cluster C-1 has a low utilization and the cluster C-2 has a high utilization. Each of the virtual machines VM1 and VM2 in the cluster C-1 uses about 20% of the respective host resources, whereas each of the virtual machines VM3-VM6 in the cluster C-2 uses 50% of the respective host resources. Therefore, although capacity is available in the cluster C-1, none of the virtual machines VM3-VM6 in the cluster C-2 can cross cluster-boundaries and be migrated into any of the host computers in the cluster C-1.

However, if the clusters C-1 and C-2 are merged together into the cluster C-3, two of the virtual machines VM3-VM6 can be moved onto the host computers H-1 and H-2 with low utilization from the cluster C-1, as illustrated in FIG. 4C, which shows that the virtual machine VM3 has been migrated to the host computer H-1 and the virtual machine VM5 has been migrated to the host computer H-2. Note that, this may not be possible if these virtual machines VM3-VM6 are incompatible with the host computers H-1 and H-2 from the cluster C-1. The consolidation prediction module 118 will return the possible VM migrations of virtual processing entities, e.g., vmotions, that load balancing may perform as a result of the merge. Typically, the greater the number of VM migrations across the cluster boundary (c1->c2 or c2->c1), the better the merge.

Figure 5:
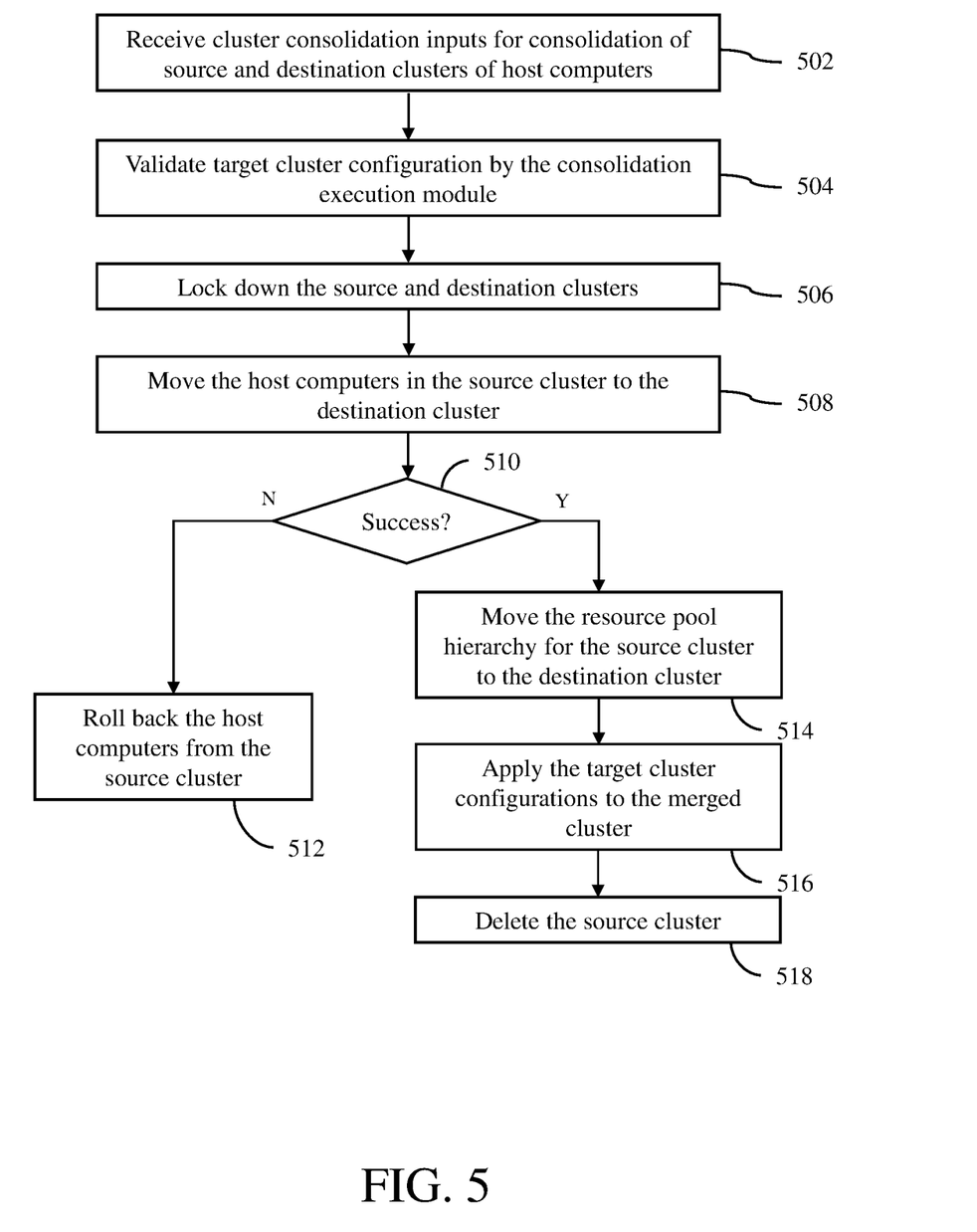
FIG. 5 is a flow diagram of a cluster consolidation execution process in accordance with an embodiment of the invention.

A cluster consolidation execution process using the consolidation execution module 120 in accordance with an embodiment of the invention is described with reference to a flow diagram of FIG. 5. At block 502, cluster consolidation inputs for consolidation of source and destination clusters of host computers are received at the consolidation execution module. The cluster consolidation inputs include identifications of source and destination clusters to be consolidated, target (merged) cluster configuration and target resource pool configuration. A resource pool is a logical abstraction for flexible management of resources. Resource pools can be grouped into hierarchies and used to hierarchically partition available resources, such as CPU and memory resources. The root node of a resource pool hierarchy represents the entire resources for the resource pool hierarchy. Other nodes of the resource pool hierarchy are descendent nodes of the root node, where the resources are divvied among the different descendent nodes based on various policies and configurations. Each of these descendent nodes can represent a smaller resource pool, a single entity, such as a virtual machine, or a group of entities.

Next, at block 504, target cluster configuration is validated by the consolidation execution module 120. This validation process may involve verifying that the number of total host computers in both the source and destination clusters is less than maximum supported cluster size for the merged cluster, i.e., the maximum number of host computers allowed for the merged cluster. The validation process may also involve validating the HA and resource management configurations for the merged cluster.

Next, at block 506, the source and destination clusters are locked down by the consolidation execution module 120. The lockdown process may involve stopping load balancing and resource divvying on the source and destination clusters. The lockdown process may also involve stopping any new migrations of virtual processing entities and waiting for ongoing migrations of virtual processing entities to complete. The lockdown process may further involve disabling resource pool creating/deletion in the source and destination clusters.

Next, at block 508, the host computers in the source cluster are moved to the destination cluster by the consolidation execution module 120. The host moving process may involve, for each host computer in the source cluster, removing an association of that host computer with the source cluster and creating an association of that host computer with the destination cluster.

Next, at block 510, a determination is made by the consolidation execution module 120 whether all the host computers in the source cluster have been successfully moved to the destination host computer. If not successful, the operation proceeds to block 512, where all the host computers from the source cluster are rolled back to the source cluster. In addition, the source cluster is unlocked and the operation is aborted. The operation then comes to an end. However, if successful, the operation proceeds to block 514.

At block 514, the resource pool hierarchy for the source cluster is moved to the destination cluster by the consolidation execution module 120 to produce a combined resource pool hierarchy for the merged cluster. In an embodiment, there are user-selectable options that specify how the resource pool hierarchies of the source and destination clusters should be merged to produce the combined resource pool hierarchy for the merged cluster. In a particular implementation, there are two user-selectable options, a conservative mode and a full merge mode.

Figure 6A:
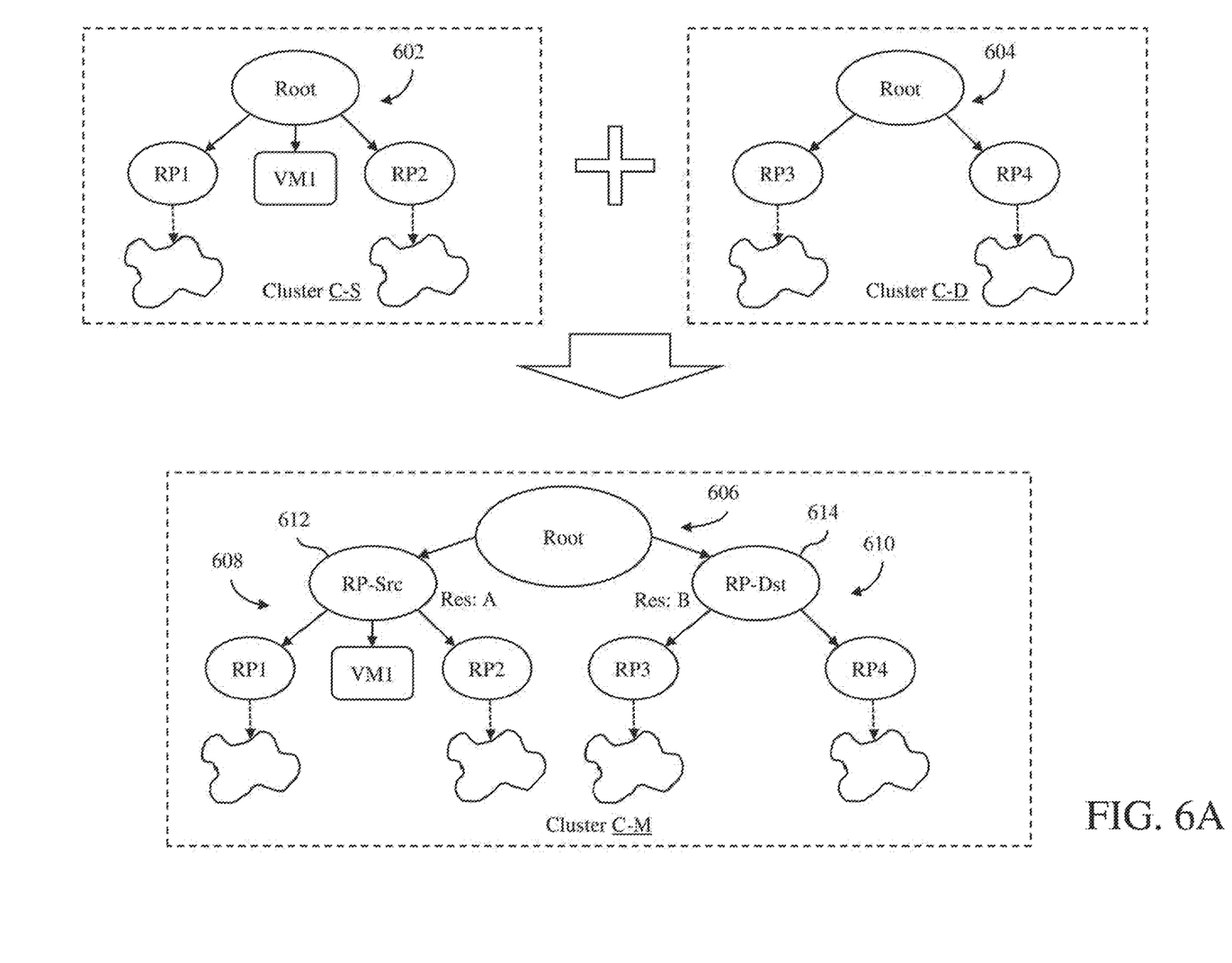
FIGS. 6A and 6B illustrate different options for merging resource pool hierarchies of source and destination clusters that are being consolidated in accordance with embodiments of the invention.

In the conservative mode, the consolidation execution module 120 attempts to preserve the original resource pool hierarchies of the source and destination clusters by creating an additional layer of resource pools. This is illustrated in FIG. 6A, which shows a resource pool hierarchy 602 of a source cluster C-S, a resource pool hierarchy 604 of a destination cluster C-D and a combined resource pool hierarchy 606 of a merged cluster C-M. The source cluster has a cluster capacity of A, while the destination cluster has a cluster capacity of B. As illustrated in FIG. 6A, the resource pool hierarchy 602 of the source cluster C-S includes resource pool nodes RP1 and RP2, a virtual machine node VM1, and other nodes. The resource pool hierarchy 604 of the destination cluster C-D includes resource pool nodes RP3 and RP4, and other nodes. The combined resource pool hierarchy 606 of the merged cluster includes new resource pool hierarchy segments 608 and 610. The new resource pool hierarchy segment 608 is similar to the resource pool hierarchy 602 of the source cluster, while the new resource pool hierarchy segment 610 is similar to the resource pool hierarchy 604 of the destination cluster.

In operation, the consolidation execution module 120 creates the new resource pool hierarchy segments 608 and 610, which will encapsulate the resources of the original source cluster C-S and the destination cluster C-D. In creating the new resource pool hierarchy segment 608 for the source cluster, the root of the resource pool hierarchy 602 of the source cluster is converted to a child node 612 (designated as "RP-Src") of the root of the combined resource pool hierarchy 606 of the merged cluster C-M. Similarly, the root of the resource pool hierarchy 604 of the destination cluster C-D is converted to another child node 614 (designated as "RP-Dst") of the root of the combined resource pool hierarchy 606 of the merged cluster. The child nodes 612 and 614 of the new resource pool hierarchy segments 608 and 610, respectively, are sibling nodes in the combined resource pool hierarchy 606 of the merged cluster. Thus, the resources for the merged cluster at its root node is divided between the child nodes 612 and 614 of the new resource pool hierarchy segments 608 and 610, respectively. The new resource pool hierarchy segments 608 and 610 will have reservations equal to the capacities of the original source and destination clusters, respectively. Thus, the reservation for the child node 612 of the new resource pool hierarchy segment 608 will be equal to A, and the reservation for the child node 614 of the new resource pool hierarchy segment 610 will be equal to B. Therefore, all workloads are guaranteed the resources of their original cluster, while being able to share resources from their sibling cluster as needed.

Figure 6B:
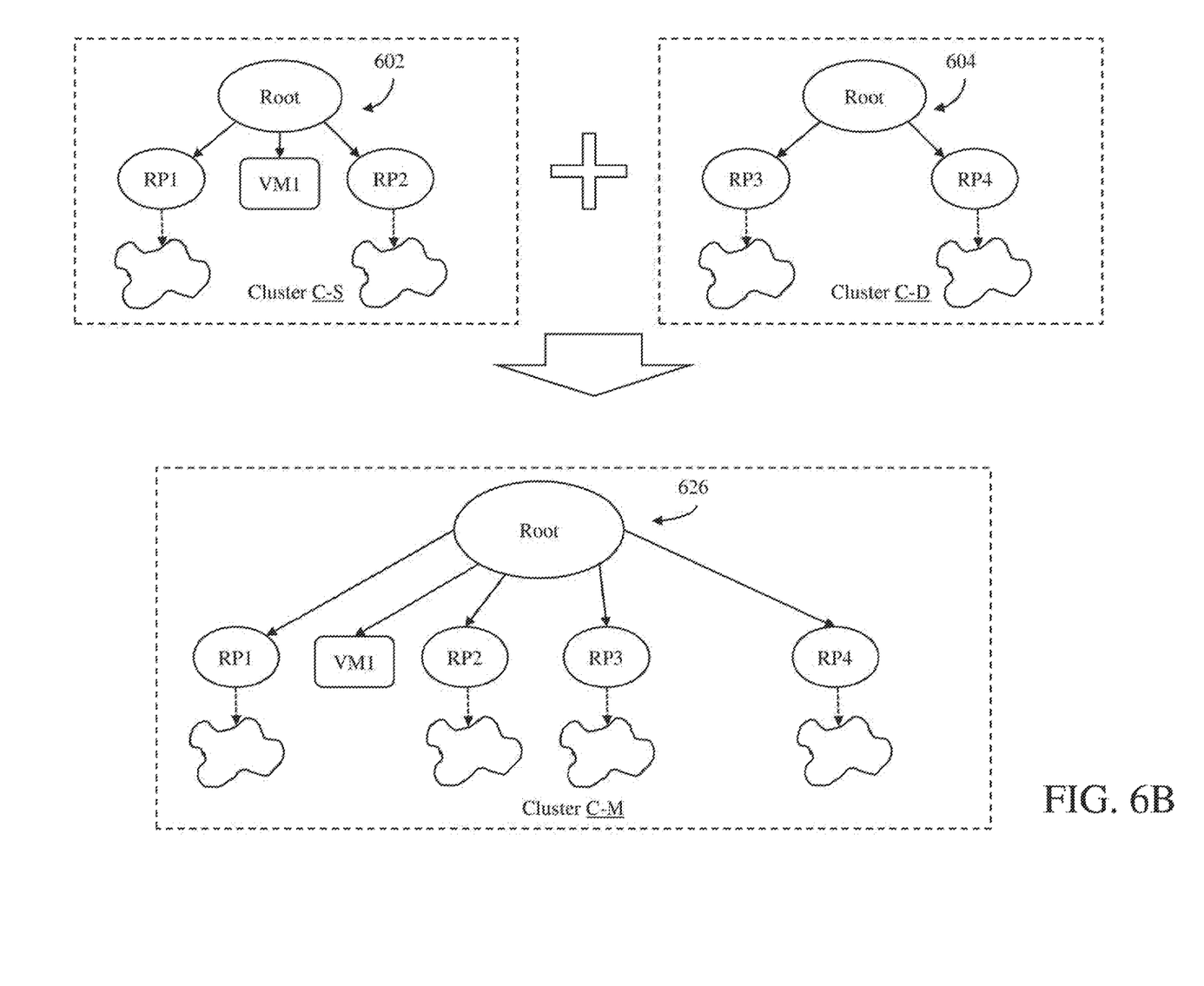

In the full merge mode, the consolidation execution module 120 does not attempt to preserve the original resource pool hierarchies of the source and destination clusters. Instead, the original resource pool hierarchy of the source cluster without its root node is moved into the root node of the resource pool hierarchy of the destination cluster. This is illustrated in FIG. 6B, which shows the resource pool hierarchy 602 of the source cluster C-S, the resource pool hierarchy 604 of the destination cluster C-D and a combined resource pool hierarchy 626 of the merged cluster C-M. The combined resource pool hierarchy 626 of the merged cluster includes the original resource pool hierarchy 604 of the destination cluster with all the descendent nodes of the original resource pool hierarchy 602 of the source cluster, i.e., all the nodes of the original resource pool hierarchy 602 of the source cluster minus its root node. Another way to look at this process is that the original resource pool hierarchies 602 and 604 of the source and destination clusters are combined such that the root nodes of these resource pool hierarchies are integrated into a single larger root node, creating the combined resource pool hierarchy 626 of the merged cluster.

Turning back to FIG. 5, next, at block 516, the target cluster configurations are applied to the merged cluster by the consolidation execution module 120. In an embodiment, HA and resource management configurations, which may have been user-specified, are applied to the merged cluster.

Next, at block 518, the source cluster is deleted by the consolidation execution module 120. In an embodiment, the source cluster may be deleted by the consolidation execution module 120 from a list of current clusters in the distributed computer system 100, which may be maintained by the cluster consolidation manager 106. The operation then comes to an end.

Figure 7:
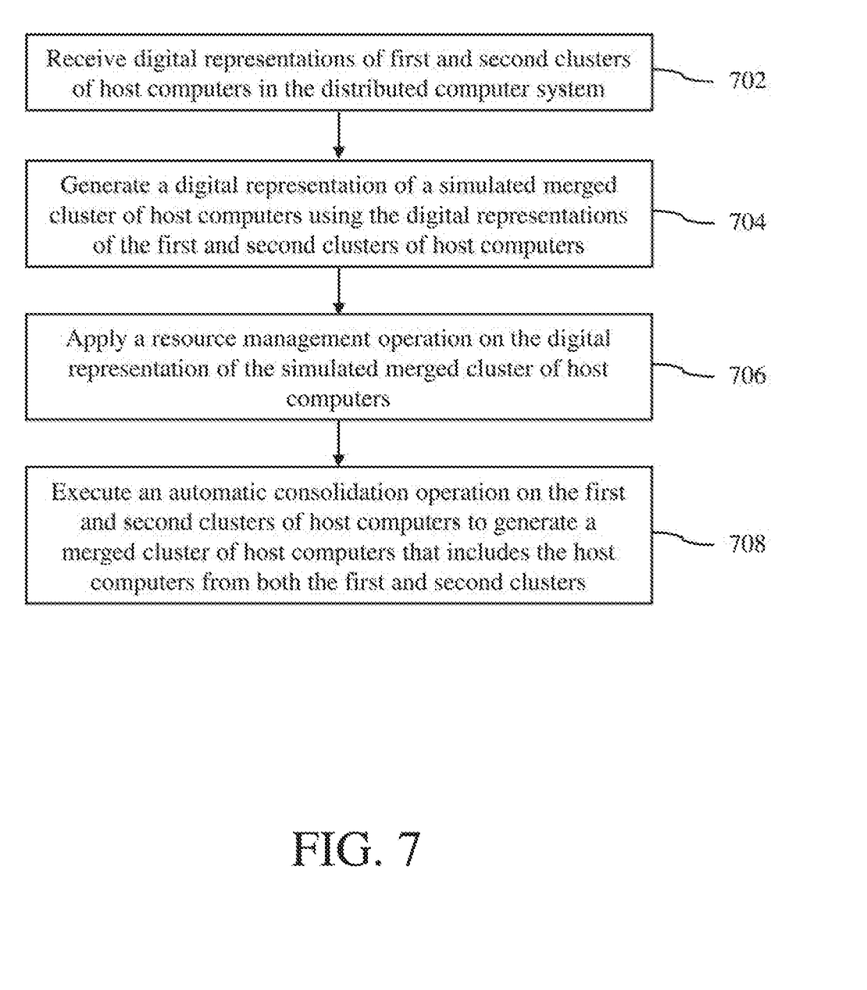
FIG. 7 is a flow diagram of a method for automatically consolidating clusters of host computers in a distributed computer system in accordance with an embodiment of the invention.

A method for automatically consolidating clusters of host computers in a distributed computer system in accordance with an embodiment of the invention is described with reference to a flow diagram of FIG. 7. At block 702, digital representations of first and second clusters of host computers in the distributed computer system are received, for example, at the cluster consolidation manager 106 in the distributed computer system 100. Next, at block 704, a digital representation of a simulated merged cluster of host computers is generated using the digital representations of the first and second clusters of host computers. The simulated merged cluster of host computers is a simulation of a consolidation of the first and second clusters of host computers. Next, at block 706, a resource management operation on the digital representation of the simulated merged cluster of host computers to produce resource management analysis results on the simulated merged cluster of host computers. Next, at block 708, an automatic consolidation operation is executed on the first and second clusters of host computers to generate a merged cluster of host computers that includes the host computers from both the first and second clusters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatically consolidating clusters of host computers in a distributed computer system, the method comprising:
   receiving digital representations of first and second clusters of host computers in the distributed computer system;
   generating a digital representation of a simulated merged cluster of host computers using the digital representations of the first and second clusters of host computers, the simulated merged cluster of host computers being a simulation of a consolidation of the first and second clusters of host computers;
   applying a resource management operation on the digital representation of the simulated merged cluster of host computers to produce resource management analysis results on the simulated merged cluster of host computers; and
   executing an automatic consolidation operation on the first and second clusters of host computers to generate a merged cluster of host computers that includes the host computers from both the first and second clusters.

2. The method of claim 1, wherein receiving the digital representations of the first and second clusters of host computers includes receiving snapshots of the first and second clusters of host computers in the distributed computer system.

3. The method of claim 1, wherein the resource management operation includes a load balancing operation and wherein the resource management analysis results include a load balancing recommendation to migrate one or more virtual processing entities from at least one host computer in the simulated merged cluster to at least another host computer in the simulated merged cluster.

4. The method of claim 1, wherein the resource management operation includes a power management operation and wherein the resource management analysis results include a power management recommendation to power off at least one of host computers in the simulated merged cluster.

5. The method of claim 1, wherein executing the automatic consolidation operation on the first and second clusters of host computers includes locking down the first and second clusters of host computers before any of the host computers in the first and second clusters of host computers are moved to create the merged cluster of host computers.

6. The method of claim 4, wherein executing the automatic consolidation operation on the first and second clusters of host computers further includes moving each of the host computers in the first cluster of host computers to the second cluster of host computer.

7. The method of claim 1, wherein executing the automatic consolidation operation on the first and second clusters of host computers includes combining resource pool hierarchies of the first and second clusters of host computers to produce a combined resource pool hierarchy for the merged cluster of host computers.

8. The method of claim 6, wherein combining the resource pool hierarchies of the first and second clusters of host computers includes placing both the resource pool hierarchies of the first and second clusters of host computers below a root node of the combined resource pool hierarchy for the merged cluster of host computers so that root nodes of the resource pool hierarchies of the first and second clusters of host computers are sibling child nodes of the root node of the combined resource pool hierarchy for the merged cluster of host computers.

9. The method of claim 6, wherein combining the resource pool hierarchies of the first and second clusters of host computers includes integrating root nodes of the resource pool hierarchies of the first and second clusters of host computers into a root node of the combined resource pool hierarchy for the merged cluster of host computers.

10. A non-transitory computer-readable storage medium containing program instructions for automatically consolidating clusters of host computers in a distributed computer system, wherein execution of the program instructions by one or more processors of a computer system causes the one or more processors to perform steps comprising:

receiving digital representations of first and second clusters of host computers in the distributed computer system;

generating a digital representation of a simulated merged cluster of host computers using the digital representations of the first and second clusters of host computers, the simulated merged cluster of host computers being a simulation of a consolidation of the first and second clusters of host computers;

applying a resource management operation on the digital representation of the simulated merged cluster of host computers to produce resource management analysis results on the simulated merged cluster of host computers; and executing an automatic consolidation operation on the first and second clusters of host computers to generate a merged cluster of host computers that includes the host computers from both the first and second clusters.

11. The computer-readable storage medium of claim 10, wherein receiving the digital representations of the first and second clusters of host computers includes receiving snapshots of the first and second clusters of host computers in the distributed computer system.

12. The computer-readable storage medium of claim 10, wherein the resource management operation includes a load balancing operation and wherein the resource management analysis results include a load balancing recommendation to migrate one or more virtual processing entities from at least one host computer in the simulated merged cluster to at least another host computer in the simulated merged cluster.

13. The computer-readable storage medium of claim 10, wherein the resource management operation includes a power management operation and wherein the resource management analysis results include a power management recommendation to power off at least one of host computers in the simulated merged cluster.

14. The computer-readable storage medium of claim 10, wherein executing the automatic consolidation operation on the first and second clusters of host computers includes locking down the first and second clusters of host computers before any of the host computers in the first and second clusters of host computers are moved to create the merged cluster of host computers.

15. The computer-readable storage medium of claim 14, wherein executing the automatic consolidation operation on the first and second clusters of host computers further includes moving each of the host computers in the first cluster of host computers to the second cluster of host computer.

16. The computer-readable storage medium of claim 10, wherein executing the automatic consolidation operation on the first and second clusters of host computers includes combining resource pool hierarchies of the first and second clusters of host computers to produce a combined resource pool hierarchy for the merged cluster of host computers.

17. The computer-readable storage medium of claim 16, wherein combining the resource pool hierarchies of the first and second clusters of host computers includes placing both the resource pool hierarchies of the first and second clusters of host computers below a root node of the combined resource pool hierarchy for the merged cluster of host computers so that root nodes of the resource pool hierarchies of the first and second clusters of host computers are sibling child nodes of the root node of the combined resource pool hierarchy for the merged cluster of host computers.

18. The computer-readable storage medium of claim 16, wherein combining the resource pool hierarchies of the first and second clusters of host computers includes integrating root nodes of the resource pool hierarchies of the first and second clusters of host computers into a root node of the combined resource pool hierarchy for the merged cluster of host computers.

19. A system comprising:

a processor; and a cluster consolidation manager that, when executed by the processor, performs steps comprising:

receiving digital representations of first and second clusters of host computers in a distributed computer system;

generating a digital representation of a simulated merged cluster of host computers using the digital representations of the first and second clusters of host computers, the simulated merged cluster of host computers being a simulation of a consolidation of the first and second clusters of host computers;

applying a resource management operation on the digital representation of the simulated merged cluster of host computers to produce resource management analysis results on the simulated merged cluster of host computers; and executing an automatic consolidation operation on the first and second clusters of host computers to generate a merged cluster of host computers that includes the host computers from both the first and second clusters.

20. The system of claim 19, wherein the cluster consolidation manager performs the step of combining resource pool hierarchies of the first and second clusters of host computers to produce a combined resource pool hierarchy for the merged cluster of host computers when executing the automatic consolidation operation on the first and second clusters of host computers.

* * * * *